US012619746B2

(12) United States Patent
Torres

(10) Patent No.: US 12,619,746 B2
(45) Date of Patent: May 5, 2026

(54) SOCIAL NETWORKING CONTENT SUPPLEMENTED WEB PAGE LINKER

(71) Applicant: Terry Lee Torres, Neptune, NJ (US)

(72) Inventor: Terry Lee Torres, Neptune, NJ (US)

( * ) Notice: Subject to any disclaimer, the term of this patent is extended or adjusted under 35 U.S.C. 154(b) by 38 days.

(21) Appl. No.: 18/810,532

(22) Filed: Aug. 21, 2024

(65) Prior Publication Data

US 2025/0094603 A1 Mar. 20, 2025

Related U.S. Application Data

(60) Provisional application No. 63/538,466, filed on Sep. 14, 2023.

(51) Int. Cl.
*G06F 21/00* (2013.01)
*G06F 21/60* (2013.01)
*G06F 21/62* (2013.01)

(52) U.S. Cl.
CPC ........ *G06F 21/602* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 7,653,687 B2 * | 1/2010 | Reisman | G06Q 10/025 |
| | | | 709/219 |
| 9,911,132 B2 * | 3/2018 | Groom | G06F 16/44 |
| 2009/0031427 A1 * | 1/2009 | Bar-El | G06F 21/10 |
| | | | 726/26 |

* cited by examiner

*Primary Examiner* — Andrew J Steinle

(57) ABSTRACT

The present invention relates to a method and system for non-intrusively associating encrypted supplemental content with web pages. The method involves creating user profiles for community-based content association, allowing users to create and manage supplemental content, and associating the content with specific web pages using URL, vision technology, and/or content recognition technologies. The system provides secure online transactions using smart contracts and blockchain technologies while delivering real-time notifications to users. Additionally, the platform offers personalized content recommendations, content moderation, and privacy controls for managing access to content. Guest access allows unregistered users to browse and view content before registration. The system ensures the integrity of the web page by preserving its original structure while enabling the non-intrusive display of supplemental content.

24 Claims, No Drawings

SOCIAL NETWORKING CONTENT SUPPLEMENTED WEB PAGE LINKER

BACKGROUND OF THE INVENTION

The present invention represents a groundbreaking innovation in the field of online content engagement, combining social media, e-commerce, and dynamic user interaction within a unified software-based framework. The present invention addresses the need for deeper engagement, personalized content, and enhanced user interaction across diverse industries such as Advertising, Marketing, Entertainment, and Ecommerce. The invention offers a platform where users can create and share supplemental content linked to specific web pages, without altering the original content, thus fostering a dynamic community-driven environment.

The present invention operates as both a browser extension and a dedicated browser for desktops and mobile platforms, enabling flexible deployment and ease of use across various devices. The core of the platform is it's linking, bookmarking, and tagging processes, which are powered by advanced cipher, encoding, decoding, and detection technologies. These technologies ensure that user-generated content is accurately and securely associated with the correct web pages, allowing users to claim ownership of web pages and create non-intrusive content overlays.

The system integrates AI-powered content curation to deliver personalized recommendations and smart content moderation. Additionally, the present invention is designed to evolve with emerging technologies such as Artificial General Intelligence (AGI) and superintelligence, which will enable more sophisticated identity verification, predictive content suggestions, and real-time user assistance. The present invention also incorporates gamification elements such as points, badges, and rankings to incentivize user participation and engagement. The platform includes a built-in marketplace that supports auctions, classified listings, and product reviews, with the potential for integrating smart contracts to automate secure transactions. Augmented Reality (AR) integration further enhances the user experience by connecting digital content to real-world objects, providing immersive interactive capabilities.

With its advanced security mechanisms, legal safeguards, and user-friendly design, the present invention ensures that supplemental content remains legally compliant while enriching the browsing experience. The platform's use of advanced technologies for secure content association, content sharing, and e-commerce transforms online interaction across a wide array of industries.

DESCRIPTION OF THE SEVERAL VIEWS OF THE DRAWINGS

NOT APPLICABLE

BRIEF DESCRIPTION OF THE INVENTION

The present invention is a comprehensive software framework designed to enhance user engagement and interaction with online content through a system of non-intrusive overlays. It operates as both a browser extension and a dedicated browser for desktop and mobile platforms, enabling users to create, link, and share supplemental content tied to specific web pages without modifying the original content. The platform integrates advanced cipher, encoding, decoding, and detection technologies to securely manage linking, bookmarking, and web page tagging processes, ensuring that user-generated content is accurately associated with the correct web pages.

The present invention also incorporates AI-powered content curation and personalization, delivering relevant content based on user preferences, while allowing for future integration of AGI and superintelligence to enhance identity verification and predictive user support. Gamification elements, such as points, badges, and rankings, are used to incentivize user participation, while a built-in marketplace supports auctions and secure transactions, with potential for smart contract integration. Augmented Reality (AR) features allow users to connect digital content to real-world objects, further enriching the interactive experience. The present invention maintains the integrity of original web content while fostering a dynamic, legally compliant community for online engagement.

DETAILED DESCRIPTION OF THE INVENTION

Overview: The present invention represents a cutting-edge software-based framework, meticulously engineered to revolutionize user interaction with online content. This framework achieves enhanced engagement through a sophisticated system of non-intrusive overlays that are seamlessly linked to specific web pages. Designed for broad adaptability, the present invention supports deployment as both a browser extension and a dedicated browser for desktop, mobile, and other platforms, ensuring it meets the demands of diverse technological environments. In addition to its core functionality of enabling supplemental content sharing, the present invention preserves the integrity of original web pages, ensuring that they remain unmodified. This feature provides an optimal balance between content creation and content preservation, facilitating a dynamic community-driven platform for personal, business, entertainment, and even educational purposes.

The present invention is further distinguished by its ability to integrate across a wide variety of devices without sacrificing user experience. Whether deployed as a browser extension on a personal computer or as a standalone mobile browser application, the platform remains versatile and consistent in its delivery of features. Users can engage in rich content interactions, adding layers of personalized or curated information on top of existing web pages, without disrupting the core structure or layout of the pages they are viewing. This system is ideal for fostering community interactions around shared interests, and the potential use cases extend far beyond basic engagement, with applications in marketing, social media, e-commerce, and even professional networks.

Moreover, the inclusion of augmented reality (AR) capabilities within the present invention's framework introduces a new dimension of interaction. Users can link digital content to real-world objects, offering an enriched experience by integrating physical and digital environments. This AR functionality provides immense potential for retail and other industries where users can scan products and access reviews, videos, or promotions directly through the present invention's interface, making the platform not only versatile but future-ready.

Core Features: At its foundation, the present invention establishes a robust and flexible environment where users can create community-based member profiles tailored to individuals, businesses, or organizations. These profiles serve as digital hubs, enabling users to curate their online presence by linking or bookmarking web pages of interest. Each link or bookmark can be enriched with supplemental content, including but not limited to text, images, audio, video, and interactive media. The system accommodates a wide variety of content types, ensuring that users can fully express their ideas, share valuable resources, or collaborate on projects within the present invention's community. This supplemental content is securely stored within the platform's cloud infrastructure and remains accessible to any community member who navigates to the associated web page. As a result, the present invention not only preserves the integrity of the original content but also fosters an enhanced layer of interaction, enabling a dynamic exchange of ideas and information.

Users are seamlessly alerted to the presence of this supplemental content through a series of non-intrusive notifications that are designed to complement, rather than interfere with, their browsing experience. For instance, the system employs a smart notification mechanism whereby an illuminated button or icon in the browser's toolbar signals that additional content is available. This method ensures that users can choose to engage with the overlays at their discretion without being forced to divert from their current activities. By clicking the browser button, users are seamlessly directed to the supplemental content, which is hosted on the present invention's platform and associated with the visited webpage. This fluid, non-disruptive approach to content notification underscores the present invention's commitment to maintaining a user-friendly experience while promoting engagement within its community.

Moreover, this feature is powered by an advanced tagging system, which leverages machine learning algorithms to continually improve the accuracy of content association and delivery. The system's ability to parse web pages, detect changes, and recognize patterns ensures that users are notified of relevant supplemental content at precisely the right time, even as web content evolves. Additionally, the platform's blockchain integration offers an immutable verification layer, ensuring that supplemental content is securely linked to its creator and remains tamper-proof. This adds an extra layer of trust and security, particularly when users engage with content related to professional or e-commerce contexts.

AI-Powered Personalization and Moderation: The present invention is at the forefront of innovation with its integration of advanced AI-driven content curation, which significantly elevates user experiences by tailoring the platform's offerings to individual preferences. The system employs sophisticated machine learning algorithms that continuously analyze user behavior, including browsing patterns, content interactions, and engagement levels. This data is then used to deliver personalized content recommendations, ensuring that users are consistently presented with supplemental content that aligns with their unique interests and needs. Whether the user is exploring business opportunities, seeking entertainment, or engaging in educational pursuits, the AI ensures that the most relevant and engaging overlays are brought to the forefront, effectively transforming the user experience into one that feels intuitive and bespoke.

The AI's role, however, extends beyond mere personalization. The system is equipped with a robust moderation framework that actively scans user-generated content for inappropriate or harmful material, promoting a healthy, safe, and engaged community. Utilizing natural language processing (NLP) algorithms, the system can automatically detect and filter offensive text, inappropriate images, and even harmful videos in real-time, ensuring that the present invention's community remains a positive and constructive environment. This AI-driven moderation not only reduces the burden on human moderators but also increases the platform's responsiveness to emerging issues, helping to maintain the integrity of the community and safeguard user experiences across all interactions.

Furthermore, to grant users more control over their experience, the present invention incorporates customizable AI-powered filters and content feeds, allowing users to fine-tune their engagement with the platform. These customizable filters enable users to prioritize specific content categories—such as product reviews, professional insights, entertainment, or personal development—according to their preferences. This highly personalized approach ensures that users receive the content they care about most, whether it's emerging trends in their industry or curated experiences tailored to their hobbies and passions. These filters are dynamically adjustable, meaning users can refine their settings over time as their interests evolve, ensuring that the present invention remains a continually relevant and engaging part of their digital lives.

In addition to this, the AI within the present invention is designed to evolve alongside the user. By incorporating reinforcement learning, the system refines its content delivery mechanisms, continuously learning from user feedback and behavior to provide an ever-improving personalized experience. As users interact with the platform, the AI adapts to their changing preferences, ensuring that the present invention remains a cutting-edge, responsive solution capable of delivering content that is not only timely but also deeply relevant to the user's ongoing journey.

Potential for AGI and Superintelligence Integration: The invention is designed with a forward-looking approach, allowing it to evolve alongside the continuous advancements in Artificial General Intelligence (AGI) and superintelligence technologies. While the present invention already harnesses powerful AI for personalization and moderation, the future integration of AGI will propel the platform to new heights of sophistication, offering capabilities that surpass the limits of current technology. These developments promise to introduce features that are more intuitive, responsive, and intelligent, revolutionizing how users interact with digital content and the broader the present invention's ecosystem.

With AGI, the system will be capable of advanced identity verification processes, offering a far higher level of accuracy and security. This next generation of AI will leverage deep learning techniques to authenticate users with enhanced precision, minimizing risks related to identity theft and fraudulent activity. Such robust identity verification will not only ensure user safety but also provide a trusted environment for transactions and interactions within the present invention's marketplace and community spaces. Users will benefit from knowing that the individuals they engage with are verified, creating a stronger foundation for social, business, and e-commerce exchanges.

In addition to security enhancements, AGI will transform the present invention's ability to deliver predictive content suggestions that far surpass the capabilities of standard AI. By drawing on a deeper understanding of user behavior and preferences, AGI will be able to anticipate user needs and desires more effectively, delivering content recommendations that align not just with current interests but with emerging patterns that users may not yet be consciously aware of. For instance, if a user frequently engages with content related to photography, AGI could predict a burgeoning interest in related fields such as videography or digital editing, offering supplemental content that expands the user's horizons while remaining contextually relevant.

Moreover, AGI will introduce real-time support that is more adaptive and context-aware. Unlike current AI systems that rely on pre-programmed responses or algorithms, AGI-powered support will be capable of understanding and responding to complex user queries in real-time, offering solutions that are nuanced and deeply insightful. This capability will not only streamline content interaction by proactively suggesting relevant materials but also enhance the user's journey by providing deeper insights into their behavior and engagement patterns. These insights can be leveraged to help users optimize their interactions with the platform, whether they are looking for ways to improve productivity, deepen their learning, or explore new areas of interest.

Superintelligence integration further extends these possibilities by enabling the platform to operate on a level that rivals human cognition in many areas. This would allow the present invention to not only predict but also actively shape user engagement in ways that are beneficial, offering sophisticated guidance that empowers users to make more informed decisions and derive greater value from their digital experiences. Through AGI and superintelligence, the present invention will evolve from a responsive platform to one that plays an active role in guiding users toward content and experiences that foster growth, innovation, and deeper connections within the community.

These advancements in AGI and superintelligence will ensure that the present invention remains a future-proof platform, capable of adapting to the ever-changing digital landscape. By continually integrating cutting-edge technologies, the present invention will redefine the possibilities of user engagement, making it not just a content-sharing platform but an intelligent assistant that intuitively understands and enhances every facet of the user's digital journey.

Content Creation and Sharing: The present invention empowers users to enhance their online experience by contributing diverse forms of supplemental content to linked and bookmarked resources, transforming ordinary web pages into dynamic hubs of user interaction and knowledge-sharing. Users can add text, images, videos, audio, and interactive media, allowing them to express personal insights, offer professional advice, or share creative works in a manner that complements the original web content. The platform's design ensures that this supplemental content remains distinct and separate from the original web page, thereby preserving the integrity of the original site while enriching the user's experience through non-intrusive overlays. This careful separation guarantees that the original web pages remain unaltered, avoiding any potential issues related to content tampering or copyright infringement.

When a member visits a linked or bookmarked page, they are seamlessly alerted to the presence of additional content through a variety of unobtrusive notification methods, including illuminated browser buttons, pop-ups, or auditory cues. These notifications allow users to quickly identify the existence of supplemental content, and with a simple click, they can easily navigate to view the enriched material. The supplemental content is hosted within the present invention's platform itself, providing users with a streamlined and fluid experience, free from the disruptions that might otherwise occur with traditional content-sharing methods. This ensures that users remain engaged and informed without being forced to abandon their primary browsing activities.

Moreover, the platform's capabilities extend beyond basic content creation by allowing for collaborative content development. Multiple users can contribute to the same content overlay, creating a shared space where ideas, information, and media can be collectively enhanced. This collaborative approach fosters a deeper sense of community and promotes the exchange of high-quality content, as users can build upon one another's contributions to create more comprehensive and informative overlays. The present invention also supports a crowdsourcing model, where the community can vote on and prioritize valuable content, ensuring that the best contributions are highlighted for broader visibility. By enabling this kind of cooperative engagement, the present invention transforms the act of content sharing into a communal endeavor, where the contributions of many can coalesce into a richer and more meaningful browsing experience.

Furthermore, the present invention employs advanced tagging and bookmarking technologies, including machine learning algorithms that continually refine the accuracy of content associations. This ensures that as web pages evolve and change, the supplemental content remains accurately linked, providing users with up-to-date and relevant information. By leveraging these technologies, the present invention not only enhances the creation and sharing of content but also ensures that users have access to the most pertinent and timely materials within their community-driven network.

Collaborative Content Creation: The present invention system fosters an environment where collaboration thrives, enabling multiple users to contribute to the same content overlay, thus creating a fertile ground for cooperative content development. Whether individuals are working on a project, sharing ideas within a professional network, or simply engaging in a community-driven initiative, this collaborative model supports an enriched content creation process that extends beyond the capabilities of any single user. By pooling resources, perspectives, and expertise, members can collectively enhance the quality and scope of the supplemental content, transforming static web pages into dynamic centers of interaction.

The present invention's collaborative content tools allow for real-time co-editing, where users can simultaneously make contributions, offering flexibility for both small teams and larger communities. This cooperative approach is supported by built-in communication features, such as in-platform messaging and video conferencing, ensuring that contributors can coordinate their efforts with ease, even across geographical distances. Additionally, the system's intuitive version control ensures that all contributions are tracked, with changes and updates seamlessly integrated into the overlay, preserving a history of edits while maintaining the integrity of the shared content.

To further enhance the community's ability to prioritize the most valuable and relevant contributions, the present invention may implement voting mechanisms. These mechanisms empower community members to review, evaluate, and rank the content produced by their peers. By casting votes, the community collectively determines which contributions should be highlighted, ensuring that high-quality content rises to the top and gains greater visibility within the platform. This democratic approach incentivizes users to contribute their best work, knowing that their efforts may be rewarded with increased recognition and engagement from the broader community.

Beyond simple voting, the present invention also supports content curation by moderators, who are tasked with overseeing the quality of contributions and maintaining the standards of the platform. By working in tandem with the community, these moderators help ensure that the most useful, insightful, or creative content is given prominence, promoting a positive and enriching environment for all users. This system of collaborative creation and curated content ensures that the present invention remains a hub for high-quality user-generated content, continuously evolving with the contributions of its active and engaged community.

Gamification and Community Engagement: The present invention leverages the power of gamification to foster a vibrant and actively engaged community. The platform integrates a dynamic system designed to incentivize user participation, rewarding users for their contributions to the ecosystem. Whether it is through the creation of valuable content, meaningful interactions with other community members, or active involvement in the integrated marketplace, users are continually recognized for their efforts. This recognition comes in the form of points, badges, and rankings, creating a framework where achievement is celebrated, and users are encouraged to consistently contribute to the platform's growth.

Every action within the present invention, from uploading insightful content to offering feedback on another user's contributions, is tracked and rewarded. Accumulating points not only boosts a user's standing within the community but also opens doors to new opportunities, such as unlocking exclusive content, gaining access to premium features, or even receiving marketplace discounts. Badges, on the other hand, act as symbols of distinction, signaling a user's expertise, reliability, and commitment. As users earn these badges, they build reputations that others in the community can rely on, fostering trust and encouraging deeper connections within the network.

In addition to these personal accolades, the present invention employs leaderboards and challenges that inject a healthy sense of competition into the community. The leaderboards rank users based on their accumulated points and contributions, creating a sense of friendly rivalry that motivates users to consistently stay engaged and strive for higher placements. Challenges, both individual and community-wide, provide users with specific goals to work towards, offering further rewards for completion. These challenges may range from content creation milestones to engagement with specific features or community-driven events, ensuring that there are always new opportunities for users to prove their skills and dedication.

Moreover, the gamification system in the present invention is designed not just for entertainment, but also to encourage positive and constructive behaviors within the community. For instance, users who provide helpful feedback or offer solutions to common problems can be recognized for their efforts, earning additional rewards and climbing the ranks. This reinforces a culture of collaboration and support, as users are incentivized to help one another, thus enhancing the overall quality of interactions on the platform.

Additionally, the marketplace itself is woven into the gamification framework, allowing users to earn rewards not only for their content contributions but also for their participation in commerce-related activities. From buying and selling products to leaving thoughtful reviews or engaging in marketplace discussions, users are rewarded for their active role in fostering a thriving digital economy. As users build their reputations and rankings within both the content and marketplace ecosystems, they contribute to a well-rounded and dynamic community that thrives on interaction, creativity, and mutual success.

This comprehensive gamification system ensures that continuous engagement is not only encouraged but embedded in the very fabric of the present invention's experience. By blending elements of competition, recognition, and reward, the platform keeps its users motivated to contribute actively, creating a self-sustaining cycle of growth that benefits the entire community.

Marketplace and E-Commerce Features: The present invention's platform is distinguished by its robust e-commerce marketplace, an essential component that empowers users to engage in a wide range of commercial activities. The marketplace enables users to list and sell products, participate in dynamic auctions, and post classified listings, transforming the present invention into a multifaceted platform where commerce thrives alongside content sharing. This seamless integration of content and commerce fosters an environment where users can fluidly transition between interacting with supplemental content and conducting business transactions without ever leaving the platform.

The marketplace is meticulously designed to accommodate both physical and digital goods, offering a diverse array of products that cater to the needs of the present invention's community. Whether users are buying or selling tangible items like electronics, clothing, or household products, or offering digital assets such as e-books, software, or multimedia files, the system supports a wide variety of commerce activities. The present invention also facilitates the exchange of licensed digital products, ensuring that intellectual property rights are respected and managed efficiently through the platform's integrated systems for licensing and digital rights management.

To further enhance the e-commerce experience, the present invention offers auction capabilities, where users can engage in real-time bidding wars for sought-after items. These auctions introduce an element of excitement and competition to the marketplace, encouraging users to actively participate in the buying and selling process. Classified listings allow users to advertise services, promote events, or sell unique products, broadening the scope of opportunities within the present invention's ecosystem.

Smart contracts are another innovative feature embedded within the present invention's marketplace. These automated contracts ensure that secure transactions are conducted with minimal risk, as they are programmed to verify and enforce the terms of the transaction without requiring intermediary oversight. Whether it's a simple product sale or a complex auction scenario, smart contracts handle payment processing, delivery confirmations, and dispute resolution, providing users with peace of mind throughout the transaction process.

The present invention also places a strong emphasis on user engagement within the marketplace, allowing users to post reviews, participate in product discussions, and rate their experiences with both products and sellers. This feedback system builds trust within the community, helping users make informed decisions when purchasing products or engaging with sellers. Detailed product reviews and seller ratings contribute to a transparent marketplace environment, where quality and reliability are prioritized.

Moreover, blockchain technology may be leveraged within the marketplace to offer a decentralized method for content verification and ownership tracking, particularly for digital goods or high-value items. This ensures that ownership and authenticity are securely recorded and maintained, offering an additional layer of security for users who engage in e-commerce through the present invention's platform.

The marketplace also supports in-platform messaging, allowing buyers and sellers to communicate directly regarding their transactions. This communication feature enhances the buying and selling process by providing a convenient channel for negotiations, clarifications, or inquiries related to product specifications, delivery, or other transaction details. The ability to communicate within the marketplace ensures that transactions proceed smoothly and efficiently, further reinforcing the user-friendly nature of the present invention's ecosystem.

In this fully integrated system, commerce and content sharing work hand in hand, creating a unified environment where users can seamlessly move between browsing content and engaging in commerce. Whether sharing supplemental content with the community or transacting in the marketplace, the present invention's users benefit from a streamlined experience that caters to their social and commercial needs alike.

Here is the expanded version of the paragraph, maintaining the original style while elaborating on the role of smart contracts within the present invention's platform:

To ensure secure transactions, the present invention incorporates smart contracts, an advanced feature that adds a vital layer of automation, security, and trust to the platform's e-commerce ecosystem. These smart contracts are designed to streamline and safeguard the transaction process by automating the verification of agreed-upon conditions before payments are released. Whether users are engaging in a straightforward purchase or a more complex auction, the smart contract automatically enforces the terms, ensuring that both parties fulfill their obligations before any exchange of funds occurs.

In practice, when a user initiates a transaction—whether it be for a physical product, a digital asset, or a service—the smart contract steps in to record the terms of the agreement. These terms might include the purchase price, delivery timelines, product specifications, or conditions of return. Once the buyer and seller have agreed to the terms, the smart contract holds the funds in a secure escrow until all conditions have been met. This automation reduces the need for manual intervention, which not only expedites the transaction process but also mitigates the risk of fraud or dispute, particularly in high-value transactions where the stakes are higher.

For auction scenarios, where users are engaged in competitive bidding, smart contracts play an equally critical role. As bids are placed and the auction progresses, the smart contract dynamically updates to reflect the highest bid, ensuring transparency and fairness. Once the auction concludes, the contract automatically verifies that the winning bidder's funds are available and secures the payment before the product is released. Should any conditions not be met—such as the failure to deliver a product or a breach of terms—the smart contract can initiate a refund process or trigger other pre-defined remedies, safeguarding the interests of all parties involved.

In addition to basic transactions, smart contracts within the present invention are designed to handle more complex scenarios, such as multi-step transactions involving multiple parties or conditional releases tied to specific events. For instance, in the case of pre-orders or crowdfunding campaigns, the smart contract can ensure that payments are only released once certain milestones have been achieved, adding yet another dimension of security and accountability to the transaction process. This functionality is particularly valuable for users engaging in high-value exchanges, as it significantly reduces the risk of disputes and fosters a higher level of trust between buyers and sellers.

By automating the transaction process, smart contracts reduce the potential for human error and eliminate the need for intermediaries, thus lowering transaction costs and increasing efficiency. Furthermore, because smart contracts are immutable—meaning they cannot be altered once established—they offer an additional layer of security that ensures the integrity of the transaction. In the event of a dispute, the contract's terms and conditions provide a clear, transparent framework for resolving the issue, protecting the rights and interests of all parties involved.

In summary, the implementation of smart contracts within the present invention adds an extra layer of security and trust, ensuring that users can confidently engage in transactions—whether simple purchases, auctions, or high-stakes exchanges—knowing that the system is designed to uphold the fairness and integrity of every transaction.

Augmented Reality (AR) Integration: The present invention is designed with a forward-thinking approach, ensuring it remains future-proof by integrating Augmented Reality (AR) capabilities into its dynamic platform. This cutting-edge feature empowers users to link digital content directly to real-world objects, seamlessly blending the physical and digital worlds in ways that enrich the user experience. For instance, users can utilize their mobile devices to scan products, locations, or even printed media, which triggers the display of related user-generated content within the present invention's ecosystem. This AR-enabled interaction goes beyond the conventional digital overlay, offering a more tactile and immersive experience that deepens user engagement with the content.

Imagine a user in a retail environment scanning a product with their smartphone. Instantly, the present invention's platform might display an overlay of supplemental content, such as reviews, demonstration videos, promotional offers, or detailed specifications—all created and shared by other members of the community. This augmented reality interaction enhances the shopping experience by providing users with rich, contextually relevant information at their fingertips. In addition to retail applications, the potential for AR extends to a variety of industries, including education, where learners can scan books or educational tools to unlock additional lessons, videos, or interactive exercises designed to supplement the physical material.

The present invention's AR system is built on a sophisticated framework of 3D object recognition, allowing the platform to identify complex shapes and surfaces, which ensures a high level of accuracy in linking digital content to the appropriate physical objects. This recognition capability goes beyond traditional QR codes or barcodes, providing users with a more intuitive and seamless experience. Whether in a museum, a conference, or a workplace, users can scan objects in their environment and instantly access supplemental content tailored to those items, allowing for enhanced exploration, learning, and engagement.

Furthermore, AR integration within the present invention paves the way for interactive marketing campaigns and promotional opportunities, where brands can leverage the platform to engage consumers in novel ways. Companies can create augmented reality experiences that connect their products to rich digital narratives, allowing users to unlock exclusive content, participate in interactive promotions, or view behind-the-scenes material simply by scanning the product packaging or an advertisement. This enhanced engagement helps brands forge stronger connections with their audience, blending physical marketing with the depth of digital interaction that the present invention facilitates.

By expanding the platform's reach into the physical world, the present invention not only enhances the user experience but also opens up new possibilities for content creators and businesses alike. The AR capabilities offer a novel means of interaction that is both practical and engaging, providing a richer, more immersive way for users to interact with content and each other. Whether applied to shopping, education, entertainment, or professional networking, AR integration positions the present invention as a forward-looking platform that connects digital and physical experiences in a meaningful and innovative way.

Notifications and Alerts: The present invention's platform is equipped with a sophisticated array of notification systems designed to ensure that users remain consistently informed about new or updated content that aligns with their interests. These notifications serve as a critical component of the user experience, keeping engagement levels high while enabling users to stay connected with the latest contributions from the community. The present invention's notifications are delivered through various channels, ensuring that users receive timely and relevant updates in a manner that best suits their preferences.

Among the most common methods of notification are pop-ups, which provide instant alerts when new content is available. These pop-ups are carefully designed to be non-intrusive, appearing only when necessary and disappearing after a set duration, ensuring that users are informed without experiencing disruption to their browsing experience. Additionally, the platform incorporates toolbar buttons, which illuminate or change color when there is new supplemental content linked to a page the user is visiting. This subtle yet effective method allows users to remain aware of new content without breaking their flow, granting them control over when and how they choose to engage with the material.

For users who prefer more passive notification systems, auditory cues are available, providing a gentle sound alert when new content becomes accessible. This feature is particularly useful for users who are multitasking or stepping away from their devices, ensuring they don't miss important updates. The auditory notifications can be customized based on user preferences, allowing them to select sounds that suit their working environment or personal taste.

In addition to these traditional notification methods, the present invention integrates dynamic content injection systems, such as JavaScript page injection, which further enhances the interactive browsing experience. These injections allow new content or notifications to be seamlessly woven into the webpage as users navigate, without altering the core structure of the original site. This innovative approach ensures that users can interact with the present invention's content in a fluid and intuitive manner, accessing overlays, new posts, or user-generated materials directly within the context of their browsing session. The notifications remain embedded within the browsing environment, allowing users to engage with them at their convenience, without interrupting the normal flow of their online activities.

Moreover, the present invention's notification system is adaptive, meaning it learns from user behavior and preferences over time. By analyzing which types of notifications the user engages with most frequently, the platform refines the delivery methods and timing of alerts, ensuring that users are only notified of content that is highly relevant to them. This personalization reduces notification fatigue and enhances the overall user experience, making the present invention not only an interactive platform but also one that intelligently adapts to individual needs.

Additionally, for users who prefer a more streamlined experience, granular notification settings are available. These settings allow users to specify exactly which types of alerts they wish to receive-whether it is notifications for new content, update to previously bookmarked pages, or community engagement signals, such as comments or likes. By providing this level of control, the present invention ensures that users remain in the driver's seat, receiving only the information that is most pertinent to their personal or professional goals.

Incorporating a diverse and adaptive notification system, the present invention ensures that users remain engaged and informed without overwhelming them. These notifications, whether delivered through pop-ups, toolbar icons, auditory signals, or dynamic content injection, provide a seamless experience that keeps users connected to the content and community they care about, all while preserving the integrity and flow of their browsing activities.

Legal and Ethical Safeguards: The present invention's framework is built with a steadfast commitment to upholding the highest standards of legal and ethical compliance, ensuring that all content sharing, linking, and community interactions adhere to the applicable laws and regulations. The platform takes a proactive approach to managing issues surrounding copyright and intellectual property, placing a strong emphasis on user accountability and education. At its core, the present invention empowers users to create and share supplemental content across a wide range of web pages, but it does so within a well-defined set of legal boundaries to ensure that these contributions are responsible and lawful.

Users are fully responsible for ensuring that the content they generate and share complies with the terms of service and legal requirements of both the present invention and the external websites to which they link. This responsibility extends to issues of copyright protection, where users must be diligent in confirming that the content they contribute does not infringe on the intellectual property rights of others. The present invention provides an extensive set of user guidelines that clearly outline the platform's policies regarding content sharing and intellectual property. These guidelines serve as a crucial educational resource, helping users understand best practices for legal compliance, content creation, and the importance of respecting the rights of original content creators.

To further safeguard against copyright infringement, the present invention employs automated content legality checks before user-generated material is published. These checks scan submissions for potential violations, flagging any content that might breach legal guidelines. If a piece of content is deemed problematic, users are notified and provided with opportunities to adjust their submissions accordingly, reducing the likelihood of any infringing material making it onto the platform. This preemptive system helps ensure that the present invention remains compliant with copyright laws while minimizing the risk of disputes or legal challenges stemming from user contributions.

Moreover, the present invention is committed to user education, offering resources and tutorials that provide guidance on the complexities of intellectual property rights, copyright laws, and ethical content creation. These resources are designed to promote responsible behavior within the community, equipping users with the knowledge they need to navigate the legal landscape of online content sharing. By making this information readily accessible, the present invention fosters a more informed and conscientious user base, ensuring that the platform operates within the legal frameworks of various jurisdictions.

In addition to educational efforts, the platform includes clear terms of service that explicitly outline the rules and responsibilities for all users. Violations of these terms, such as repeated instances of copyright infringement or the sharing of illegal content, can lead to disciplinary actions, including account suspension or termination. This enforcement mechanism ensures that users are held accountable for their actions, reinforcing the importance of compliance while maintaining the integrity of the present invention's community.

Beyond copyright protection, the present invention adheres to ethical standards regarding content creation and interaction. Users are expected to engage in respectful communication, avoid misleading or deceptive practices, and refrain from sharing harmful or inappropriate material. The present invention's AI-powered moderation system works in tandem with human moderators to ensure that content meets the platform's ethical guidelines, filtering out offensive material and promoting a healthy, constructive community environment.

The present invention also incorporates blockchain technology to verify the ownership of certain types of digital content. By recording transactions and content ownership on an immutable ledger, the platform provides an additional layer of protection for content creators, particularly in the context of high-value intellectual property or digital assets. This decentralized verification system ensures that users retain control over their creations while offering proof of authenticity, further bolstering the platform's commitment to legal and ethical compliance.

In summary, the present invention is dedicated to maintaining a legally compliant and ethically sound environment. By providing users with the tools and knowledge needed to navigate complex legal landscapes and enforcing its policies through robust safeguards, the platform ensures that content sharing remains within the bounds of the law while promoting a culture of respect and responsibility. This comprehensive approach helps build trust within the community, positioning the present invention as a leader in responsible, compliant content-sharing practices.

Additionally, the present invention operates with an unwavering commitment to legal compliance, ensuring that the integrity of original web pages is meticulously preserved. The platform's core functionality is centered around the creation and sharing of supplemental content in a manner that respects the rights of original content creators and web page owners. To achieve this, all supplemental content is confined strictly to a private community environment within the present invention's platform. This separation from the public-facing content of the original web pages is a fundamental safeguard that ensures the additional material created by users is never misrepresented as belonging to or endorsed by the owners of the original WebPages.

This careful division between the original content and the supplemental overlays is central to the present invention's mission of providing a robust content-sharing platform that operates without infringing on the intellectual property rights of others. By keeping the supplemental content within a closed, community-driven environment, the present invention ensures that the original webpage owners retain full control over their sites, with no risk of their content being altered, copied, or displayed out of context. This structure allows the present invention's users to freely and creatively share their own insights, opinions, and media without violating the terms of service of the websites they engage with.

Furthermore, the platform employs sophisticated content management systems that prevent any cross-over between the supplemental content and the original web pages. All supplemental material remains securely hosted on the present invention's platform and is only accessible to other community members who are logged in and have appropriate access rights. This closed-loop system ensures that the original web pages are never modified or tampered with in any way, preserving their authenticity and the intentions of the original creators.

The private community structure also offers additional protections for users, ensuring that any supplemental content they create remains protected from unauthorized distribution or misrepresentation outside the present invention's environment. This promotes an atmosphere of open creativity and sharing, knowing that the platform is legally structured to prevent misuse or misrepresentation of both the original and supplemental content.

The present invention takes every precaution to ensure that its users operate within the bounds of website terms of service. By confining all content interaction within the platform's private environment, users are free to engage in dynamic and creative content sharing without fear of overstepping legal boundaries or infringing on the rights of web page owners. This approach reflects the present invention's dedication to upholding a balance between innovative content sharing and rigorous legal standards, providing a space where creativity and compliance coexist harmoniously.

By maintaining these strict divisions between original web content and supplemental overlays, the present invention not only protects the rights of web page owners but also fosters trust and integrity within the platform. Users can rest assured that their contributions will not interfere with the external websites they engage with, and original content creators can be confident that their intellectual property will remain untouched and unaltered by the present invention's users. This structure ultimately ensures that the present invention's platform remains legally compliant while supporting a vibrant, community-driven environment for content creation and sharing.

Cross-Platform Integration: The present invention extends its versatility by being designed with the capacity for cross-platform integration, allowing users to leverage the platform's powerful content-sharing capabilities across a wide range of third-party tools and social media environments. By enabling seamless integration with platforms like SLACK team collaboration software, TRELLIS project management platform, MICROSOFT TEAM team collaboration software, and more, the present invention empowers users to incorporate its features into their existing professional, collaborative, and social workflows, significantly broadening the scope and application of the technology. This level of integration facilitates a smooth transition between content sharing on The present invention and the user's day-to-day digital operations, making the platform adaptable to diverse user needs, from personal projects to enterprise-level collaboration.

Incorporating the present invention's functionality into these third-party tools creates a unified digital ecosystem where users can efficiently share and manage supplemental content across multiple platforms without needing to navigate between disparate systems. For example, a team working on a project in TRELLIS project management platform could seamlessly link supplemental content from the present invention directly to their project boards, allowing team members to access additional resources, documents, or multimedia content without disrupting their workflow. Similarly, a SLACK team collaboration software channel could be enriched by supplemental content, providing an integrated space where team members can engage in discussions while accessing content that enhances their understanding of a particular topic or project.

Beyond internal collaboration tools, the present invention's cross-platform integration also extends to social media platforms, enhancing users' ability to distribute and share their content more broadly. This functionality allows the present invention's users to link supplemental content with posts on platforms like Twitter, Face book, LinkedIn, or Integra, thus expanding the reach of their contributions beyond the present invention's community. By connecting with established social networks, the present invention's users can amplify their visibility and engage with a wider audience, while still preserving the integrity and privacy of the supplemental content within the present invention's platform.

Furthermore, this cross-platform functionality is designed to work in tandem with the present invention's advanced security and compliance systems, ensuring that content remains legally compliant and ethically shared even when it's disseminated across multiple platforms. The supplemental content remains secure within the present invention's environment, where privacy settings and permissions are strictly enforced, preventing unauthorized access or distribution. Whether sharing content within a corporate environment, a classroom, or across public social networks, users can trust that the present invention's framework will maintain the integrity of their contributions while ensuring that they reach their intended audience.

This integration flexibility extends the utility of the present invention far beyond its core as a content-sharing platform, allowing it to become an indispensable tool in professional collaboration, project management, education, and marketing. For instance, educators using MICROSOFT TEAMS team collaboration software for remote learning could integrate the present invention's content overlays into their lesson plans, offering students access to additional resources that complement their studies. Marketing teams could use SLACK team collaboration software to collaborate on campaigns, linking to real-time feedback and reviews gathered through the present invention's marketplace features. This multifunctional integration makes the present invention not just a social tool but an essential component of modern digital workflows across industries.

Through its cross-platform integration, the present invention broadens its reach and relevance, enabling users to maximize the value of their supplemental content while seamlessly embedding it into their professional and social environments. This adaptability ensures that the present invention remains a dynamic, future-proof platform, capable of evolving alongside the ever-changing landscape of digital tools and user needs.

For example, a user could seamlessly link a project management tool like Trello to a specific webpage, enabling their team to collaborate on tasks related to that web content in real-time. By integrating the present invention's supplemental content overlays directly into the Trello workspace, users can enrich their project boards with a wealth of related information—be it text, images, videos, or interactive media—allowing team members to access all the resources they need without leaving their project management environment. This functionality enhances productivity by keeping the team aligned and focused on the project's objectives while utilizing the supplemental content as a valuable resource for informed decision-making and streamlined collaboration.

The ability to link web content directly to task boards opens up numerous possibilities for teams working on projects ranging from product development to marketing campaigns. For instance, a marketing team could use Trello to track the progress of a campaign and simultaneously link supplemental the present invention's content such as competitor analysis, customer feedback, or design mockups to specific tasks. This allows the team to have all the relevant data in one place, accessible within their workflow, which facilitates more informed discussions, reduces context switching, and enhances the overall efficiency of the project.

Similarly, the present invention's users could share their content overlays directly to social media platforms, such as Twitter, Facebook, LinkedIn, or Instagram, thereby enhancing visibility and engagement within broader networks. By leveraging social media's vast reach, users can expose their content to larger audiences while still ensuring that the supplemental content remains securely hosted within the present invention's environment. For instance, a content creator could share an overlay featuring a video tutorial linked to a professional article on LinkedIn, thereby expanding the conversation around the topic while driving engagement from colleagues and industry peers.

Furthermore, this cross-platform sharing mechanism allows users to craft more engaging social media posts by incorporating rich media and interactive elements from their overlays. Whether it's a short clip from a longer video, an insightful infographic, or an expert opinion piece linked to a webpage, these content overlays enhance social media posts, making them more compelling and shareable. This, in turn, drives higher levels of interaction and engagement with the audience, allowing users to increase their influence and establish a stronger digital presence across multiple platforms.

The present invention's cross-platform capabilities also ensure that, regardless of where the content is shared, the original web page remains unaltered and compliant with copyright and intellectual property laws. This enables users to freely and creatively distribute their content across different networks without concerns about infringing on the rights of the web page owners or violating terms of service. The content overlays remain an integral part of the present invention's ecosystem, with only the links and preview elements appearing on external platforms, ensuring that the user's original contributions remain secure and protected within the present invention.

By enabling real-time collaboration on professional tools like Trello and enhanced visibility on social media platforms, the present invention ensures that users can effectively expand their reach while maintaining control over their content. This cross-platform synergy not only enriches the user experience but also strengthens the practical applications of the present invention across a variety of contexts—from business to education to social influence—broadening the utility of the platform far beyond its original scope.

Linking, Bookmarking, and Web Page Tagging Processes: The linking, bookmarking, and web page tagging processes within the present invention are powered by a robust suite of advanced technologies, all of which are meticulously designed to ensure accurate, secure, and seamless associations between user-generated content and the corresponding web pages. These processes are underpinned by sophisticated ciphers, encoding, decoding, and detection mechanisms that work in concert to maintain the integrity of the content, enhancing user experiences while preserving the accuracy of the associations across various web pages.

Whether users are linking to a page, bookmarking a resource, or tagging specific elements of a site, the present invention's technologies ensure that their interactions are precise, secure, and resilient, even as the web evolves.

Linking: When a user creates a link to a specific web page, the present invention employs ciphering and encoding techniques to securely associate the link with the user's profile and any corresponding supplemental content. These security measures are designed to ensure that the association between the link and the content remains tamper-proof, safeguarding the user's contributions from unauthorized alterations. The present invention's advanced content detection technology, which incorporates content parsing, image recognition, and even machine learning algorithms, ensures that the correct web page is always identified and tagged. This process allows for accurate content association, even as web pages are updated or undergo structural changes. As users generate content, the platform uses these sophisticated mechanisms to ensure that their supplemental materials remain accurately linked to their respective pages, maintaining the relevance and integrity of the content over time.

Beyond traditional content detection, AL, AGI, and vision-based models (e.g., Optical Character Recognition [OCR], which extracts textual data from visual elements) enhance this process by providing real-time verification of the user's current webpage. As the user arrives at a new page, the present invention captures screenshots and utilizes AI-powered vision technology to compare the screen against known data, ensuring precise identification of the page the user is interacting with. This approach represents the next generation of page identification technology, further strengthening the link between user-generated content and the web pages it references. By employing these sophisticated techniques, the present invention ensures a near-flawless process that maintains user trust and guarantees that the content remains securely tied to its intended location.

Bookmarking: In addition to the linking functionality, the present invention provides users with the ability to assert ownership over specific web pages by bookmarking them. The platform leverages strong encryption methods, including cipher-based encoding, to safeguard the user's claim to their bookmarked pages. This encryption ensures that the association between the web page and the user's supplemental content remains secure and impervious to tampering. Furthermore, the present invention's content detection mechanisms employ a combination of URL recording, photo recognition, and metadata tagging to verify the identity of the page being bookmarked. This level of precision ensures that users can trust the system to accurately preserve their bookmarks, even as web pages undergo updates or changes. The present invention protects these associations over time, ensuring that users' supplemental content is consistently tied to the correct pages.

Tagging: The present invention enables dynamic tagging of web pages using a powerful combination of hashing algorithms, encoding techniques, and advanced content detection technologies. These tagging methods ensure that supplemental content is accurately and securely linked to the correct web pages, regardless of how the content on those pages may shift or evolve. The platform's reliance on hashing algorithms ensures that each tagged page has a unique, unalterable identifier, which helps maintain a secure and consistent connection between the page and the supplemental content. Additionally, machine learning algorithms continuously improve the accuracy of tagging and content detection by learning from patterns in the data. This self-improving system enables the present invention to adapt to changes in the structure or content of web pages, ensuring that the user's contributions remain relevant and accessible over time.

The tagging system is further bolstered by AI and future AGI capabilities, which are integrated to offer predictive tagging and context-aware recognition. These intelligent systems can anticipate changes to web pages or identify emerging patterns, helping users tag content with greater accuracy and confidence by generating unique identifiers for web resources (e.g., through URL recognition, metadata parsing, structural analysis, and AI-based fingerprinting). By leveraging these vision-based models to verify the presence of specific visual or textual elements on a page, the present invention ensures that the tagging process remains dynamic and adaptable. This advanced detection and verification technology represents a cutting-edge approach to content association, ensuring that users can confidently tag, bookmark, and link their supplemental content to web pages without concern for evolving digital environments.

In essence, the present invention comprehensive linking, bookmarking, and tagging processes are designed to deliver unparalleled accuracy, security, and flexibility, making the platform a trusted tool for users looking to create and manage supplemental content. Through its integration of encryption, AI, AGI, and machine learning technologies, the present invention provides an innovative solution that not only keeps pace with the ever-changing landscape of the web but also sets a new standard for content association and integrity.

Security and Verification: The present invention places security and verification at the core of its architecture, integrating advanced cipher algorithms such as Elliptic Curve Cryptography (ECC) to secure the association between user-generated content and web pages. By employing ECC, the present invention ensures that the connection between the content and its linked web page remains cryptographically protected from tampering, unauthorized access, or any form of corruption, both during transmission and storage. This method of encryption, known for its efficiency and robustness, adds a layer of security that guarantees the integrity of user contributions while minimizing the computational overhead. Whether users are linking to webpages, creating bookmarks, or tagging content, they can be confident that their data remains secure and inaccessible to malicious entities attempting to intercept or alter the information.

In addition to traditional encryption, the present invention enhances security through the incorporation of blockchain-based verification, a powerful decentralized system that ensures immutable verification of content ownership. Blockchain technology adds a trust layer to the platform by recording user contributions on an unalterable ledger, offering a transparent and decentralized method for tracking the ownership and authenticity of user-generated content. By using decentralized blockchain ledgers, the present invention eliminates the possibility of unauthorized content alterations, making it virtually impossible for anyone to falsify the ownership of contributions or modify the recorded history of interactions within the platform. This not only boosts user trust but also provides a valuable tool for protecting intellectual property rights and maintaining the authenticity of digital assets.

Blockchain-based verification plays a crucial role in content ownership management, particularly for high-value digital assets or intellectual property shared within the present invention's environment. As users create or upload supplemental content, each piece is registered within the blockchain, ensuring that it can be verified at any point in the future as the original and unmodified contribution of the user. This decentralized system is especially useful in e-commerce transactions, where it may be necessary to verify the authenticity of digital products or trace the origins of a particular contribution to ensure it is genuine and legally protected.

Beyond the encryption and blockchain layers, the present invention is also equipped with real-time security monitoring systems that detect suspicious activity, such as unauthorized attempts to access user data or tamper with content associations. These systems automatically trigger alerts and take immediate action to neutralize potential threats, safeguarding user data and content from both internal and external risks. By combining encryption, blockchain, and real-time monitoring, the present invention creates a multitiered security framework that operates across all facets of the platform, ensuring that users can confidently engage with content sharing and collaboration without compromising their privacy or data security.

Furthermore, in scenarios where even greater verification precision is required—such as for high-value digital goods or intellectual property transactions—the present invention can employ smart contracts to enforce the terms of content ownership and transaction agreements. These smart contracts automatically verify that all conditions are met before transferring ownership or access rights, ensuring that all transactions are securely executed and legally binding.

The integration of AI and AGI technologies into the present invention's security infrastructure further enhances the platform's protective measures through privacy mechanisms (e.g., encryption and anonymization, ensuring compliance with GDPR and CCPA). These intelligent systems continuously analyze user behavior and network patterns, identifying anomalies or potential security threats before they escalate. In conjunction with the vision-based verification models, AI and AGI ensure that the content associations remain accurate, securely tied to the correct pages, and resilient to any attempt at unauthorized tampering.

In summary, the present invention's security and verification systems provide a comprehensive, multi-layered defense that not only protects user-generated content from unauthorized access and tampering but also ensures immutable verification of ownership and authenticity. By leveraging advanced encryption algorithms, blockchain technology, and smart contracts, the platform offers users a highly secure environment in which they can share, create, and engage with confidence, knowing that their contributions are safeguarded and verifiable at every step of the process.

By integrating these advanced technologies into the linking, bookmarking, and tagging processes, the present invention creates a reliable and secure environment where users can confidently interact with and contribute to web content, all while preserving the integrity of the original pages. The use of cutting-edge encryption methods, such as Elliptic Curve Cryptography (ECC), ensures that every link, bookmark, and tag is securely associated with the respective user-generated content, safeguarding these connections from tampering or unauthorized access. These encryption techniques ensure that any supplemental content is not only tied to the correct web pages but is also protected during every stage of its lifecycle, from creation to storage and beyond.

The integration of blockchain-based verification into this process further strengthens the platform's security by providing decentralized, immutable records of content ownership and association. Every piece of supplemental content linked to a web page is logged onto the blockchain, creating an unalterable history that can be accessed to verify the authenticity and ownership of the contributions. This guarantees that no matter how much web pages evolve or change over time, the integrity of the content remains uncompromised, and users can rely on a permanent, decentralized ledger to confirm the accuracy and origins of their contributions.

By combining these technologies with AI-driven vision models, the present invention also ensures precise content association through processes executed locally (client-side operation, where computations occur on the user's device) to preserve privacy. AI and superintelligence systems continuously monitor and verify that each piece of supplemental content is accurately tied to the correct web page. Using real-time screenshot capture and vision-based analysis, the platform verifies that the user is interacting with the intended page, taking into account any potential changes to the layout or structure of the site. This layer of vision technology ensures that every tag, bookmark, and link is dynamically adjusted to remain relevant, even as websites undergo updates, minimizing errors in content association.

Additionally, these processes help to maintain legal compliance, ensuring that any supplemental content shared on the present invention adheres to the terms of service and intellectual property laws governing the original web pages. By keeping the supplemental content confined to a private, community-driven environment, the present invention prevents the misrepresentation of content as belonging to the original page owners, thereby safeguarding both the users and the platform itself from potential legal issues. Users can contribute freely, knowing that their content will not infringe upon the rights of others, thanks to the platform's sophisticated compliance mechanisms that automatically flag and address potential legal concerns.

The present invention's seamless integration of encryption, blockchain, AI, and machine learning into its core processes guarantees that all supplemental content is accurately associated with the appropriate web pages. This not only enhances user engagement by creating a dynamic, interactive layer on top of existing content but also upholds the integrity of the original web pages. In doing so, the present invention establishes itself as a platform where users can explore, contribute, and engage with confidence, knowing that the security, accuracy, and legality of their actions are preserved at every step of the way.

Real-Time Collaboration Tools: The present invention's framework is designed to support real-time collaboration, offering users the ability to contribute to content overlays simultaneously and with great efficiency. This functionality enables teams of users to engage in cooperative content creation, allowing them to discuss, edit, and develop ideas in real-time. By fostering collaboration at every stage of the process, the present invention is ideal for projects that require continuous input from multiple users, such as research, planning, creative endeavors, and even large-scale business initiatives. This real-time collaborative capability transforms the present invention into a dynamic platform where users can collectively contribute their expertise, ensuring that projects move forward seamlessly with the benefit of shared insights and contributions.

The present invention makes collaboration intuitive and seamless through the integration of real-time messaging systems, video conferencing, and collaborative editing features. These tools are deeply embedded within the platform, allowing users to communicate effectively while working together on content overlays. Teams can share ideas and provide feedback without needing to leave the platform, reducing friction and making the entire process more efficient. Whether it's sending quick messages through the integrated chat system or hosting video meetings to discuss complex topics, users have everything they need to coordinate and collaborate without missing a beat.

The collaborative editing features in the present invention takes this interactivity even further. Multiple users can work on the same content overlay simultaneously, making changes in real-time and seeing those changes reflected immediately across the team. This eliminates the need for back-and-forth file exchanges or version control issues, as everyone is working from the same, continuously updated content. Whether it's drafting documents, editing multimedia content, or refining design elements, the present invention ensures that the work is always synchronized, up-to-date, and reflective of the team's collective input.

The platform's real-time collaboration tools are particularly valuable for businesses and teams that are engaged in joint projects, such as product development, marketing campaigns, and strategic planning. Teams working across different locations or time zones can contribute to the same project simultaneously, ensuring that the work progresses efficiently even when participants are not physically together. Moreover, the present invention keeps the collaboration anchored to the original web content, meaning that all discussions, edits, and content creation efforts remain connected to the source material, preserving context and ensuring relevance throughout the collaboration process.

For research teams, the present invention provides an environment where data, findings, and analyses can be instantly shared and discussed, accelerating the pace of discovery and innovation. Creative teams, such as those working in media production, design, or content creation, benefit from the platform's ability to host real-time brainstorming sessions, where ideas can be developed on the fly, supported by instant feedback and input from peers. The ability to iterate quickly and see how suggestions can be implemented in real-time transforms the creative process into a more fluid and adaptive experience, fostering innovation and pushing projects forward at a faster pace.

The real-time collaboration tools also support document sharing, version control, and track changes functionality, ensuring that all contributions are properly recorded, and teams can easily revert to previous versions if necessary. This level of control is particularly useful for projects with multiple stakeholders, where it is essential to maintain a clear record of changes and decisions made during the collaboration. By incorporating these advanced features, the present invention empowers teams to create, modify, and share content within its ecosystem without ever losing connection to the original web content or compromising the project's quality.

Ultimately, the present invention's real-time collaboration capabilities offer a more interactive, team-oriented environment perfectly suited for any group that requires cooperative effort and efficient communication. Whether it's a business working on a joint project, a research team collaborating on new findings, or a creative group developing innovative content, the present invention provides the tools necessary to enhance collaboration and ensure that all team members remain connected, engaged, and productive.

User Education and Legal Compliance: Beyond the platform's robust legal safeguards, the present invention takes a proactive approach by introducing a comprehensive educational component aimed at helping users navigate the complexities of intellectual property laws and best practices for content creation. Recognizing that legal compliance is critical to the success and sustainability of user contributions, the present invention provides an extensive array of guidelines, tutorials, and resources designed to educate users on the importance of adhering to copyright regulations, terms of service for external websites, and responsible content-sharing practices. These resources are easily accessible within the platform and tailored to a wide range of users, from novice content creators to experienced professionals.

The user education system within the present invention offers step-by-step guidance on how to create and share content responsibly, ensuring that users understand how to navigate copyright laws, avoid infringement, and respect the intellectual property rights of others. Tutorials cover various aspects of legal compliance, including how to properly attribute sources, use licensed media, and comply with the terms of service set forth by external websites that may be linked to or supplemented by content created within the present invention. These educational resources are regularly updated to reflect changes in copyright law and digital rights management, ensuring that users are equipped with the most current information and can remain compliant in an ever-evolving digital landscape.

The present invention also places a strong emphasis on ethical content creation, guiding users on the importance of honesty, transparency, and respect in their work. Tutorials address responsible sharing practices, ensuring that users understand the potential impact of their content on external platforms and how to avoid misleading or harmful representations. By instilling these ethical practices, the present invention fosters a community culture where respect for intellectual property and responsible content sharing are integral to the platform's collaborative environment.

To further minimize the risk of legal issues arising from improper content creation or sharing, the present invention incorporates automated content legality checks. These checks are seamlessly integrated into the content submission process, scanning user submissions for potential copyright infringement before the content is published or made available to the community. This preemptive system serves as an additional layer of protection, ensuring that users are notified of any potential legal concerns related to their content. If a submission is flagged, the system provides clear feedback, allowing the user to adjust the content-whether it involves obtaining the proper licenses, reformatting the material, or removing infringing elements-before it becomes publicly accessible.

This automated system is powered by advanced AI algorithms that are continuously trained to recognize a wide range of content types, including text, images, video, and audio, ensuring that all forms of user-generated content are subject to the same rigorous scrutiny. These algorithms can detect copyright violations, including improperly attributed media, unauthorized use of protected works, and breaches of terms of service agreements with third-party platforms. By offering this level of automated protection, the present invention reduces the likelihood of legal conflicts arising from user contributions, safeguarding both the platform and its users from potential copyright disputes and intellectual property claims.

In addition to flagging potential copyright issues, the present invention also provides in-platform guidance on how users can resolve these concerns. Whether it involves obtaining a license for copyrighted material, applying fair use principles, or seeking permissions from the original content owners, the platform offers step-by-step instructions on how to bring content into compliance. This ensures that users not only understand the legal implications of their contributions but also have the tools to make the necessary adjustments without derailing their creative or professional efforts.

By providing users with these educational resources and automated checks, the present invention helps to ensure that content creation remains both legally compliant and ethically sound. Users can confidently contribute to the platform, knowing that they are fully informed about the legal frameworks that govern content sharing and are supported by tools designed to prevent issues before they arise. This commitment to user education and legal compliance not only protects the individual user but also upholds the integrity of the entire The present invention's community, ensuring that the platform remains a safe, trusted space for content creation, collaboration, and innovation.

Security and Privacy: At the heart of the present invention's infrastructure is a deep commitment to security and privacy, ensuring that users can engage with the platform with confidence. All supplemental content generated by users is stored securely within the platform's protected database, employing advanced encryption methods to safeguard data against unauthorized access or breaches. These encryption techniques ensure that the integrity of both the content and user data is maintained, offering robust protection from cyber threats and ensuring that all interactions within the present invention are secure, whether during transmission or storage.

The present invention empowers users to take full control of their content visibility, providing a set of granular permission settings that allow users to define precisely who can access their contributions. This level of control ensures that personal or sensitive information is only accessible to intended recipients. For example, users can choose to share content with specific individuals, select groups, or make it available to the broader community, depending on their preferences and needs. These tailored permissions offer users peace of mind, knowing that they have the ability to manage and protect their content at all times.

For content that contains personal or sensitive information, the present invention allows users to lock down access, ensuring that only designated individuals or groups—such as project collaborators, business partners, or close friends—can view the content. This fine-grained control makes the present invention especially suitable for professional environments, where sensitive business documents, proprietary research, or confidential communication must be securely shared with trusted parties while remaining inaccessible to others.

Additionally, the present invention's encryption methods are designed to meet the highest industry standards. The platform employs end-to-end encryption for data transmission, meaning that user data is encrypted both at rest and in transit, preventing unauthorized access during any stage of communication. This ensures that even in the unlikely event of interception, the data remains secure and unreadable to outside parties. Whether users are sharing multimedia files, documents, or other supplemental content, they can trust that the present invention's encryption protocols keep their information secure and private.

The present invention also incorporates multi-factor authentication (MFA) to enhance account security. Users are prompted to verify their identity using multiple authentication factors, such as a password combined with a code sent to their mobile device or a biometric scan. This layered security approach significantly reduces the risk of unauthorized access, ensuring that user accounts remain protected even if one authentication method is compromised. By incorporating MFA, the present invention reinforces its commitment to maintaining high-level security for all users.

In addition to user-level controls, the present invention maintains rigorous internal security protocols that monitor the platform for unusual activity or potential vulnerabilities. AI-powered security systems continuously analyze patterns of behavior across the platform, identifying and addressing potential threats in real-time. These systems are designed to detect anomalies—such as repeated failed login attempts, unusual content access patterns, or data exfiltration attempts—and automatically trigger protective measures. By employing real-time monitoring, the present invention ensures that any potential threats to user security and privacy are swiftly neutralized, maintaining the platform's reputation as a secure and trusted space for content creation and sharing.

Furthermore, the platform's privacy features extend to anonymization capabilities that allow users to interact with content or collaborate with others without disclosing personal identifiers. This feature is particularly valuable in cases where privacy is paramount, such as in research environments, medical discussions, or sensitive business negotiations. Users can engage in content sharing or collaborative projects while keeping their personal details secure and private, adding another layer of confidentiality to their interactions on the present invention.

By offering these advanced security and privacy features, the present invention creates a trusted environment where users can confidently share, create, and collaborate without fear of compromising their personal information or intellectual property. With end-to-end encryption, granular permission settings, multi-factor authentication, and real-time security monitoring, the present invention ensures that every aspect of the user experience is protected, preserving the integrity and privacy of user contributions while empowering individuals to maintain full control over their content.

Optional Blockchain Integration for Content Verification: To further enhance the integrity and trustworthiness of the present invention's platform, an optional integration of blockchain technology could be incorporated to manage content verification and ownership tracking. By leveraging blockchain's decentralized and tamper-proof nature, the present invention would offer users a highly secure and transparent method for ensuring that user-generated content is accurately attributed to its rightful creator and that ownership remains immutable. Each contribution—whether it be intellectual property, digital art, multimedia content, or other creative works—would be registered on a blockchain ledger, creating an unalterable record that verifies the authenticity and provenance of the content.

Blockchain integration would serve as an invaluable tool for protecting high-value content, such as intellectual property, digital art, or licensed works, that are shared within the present invention's ecosystem. For creators, this would provide an additional layer of security and confidence, ensuring that their contributions are properly attributed and securely stored in a manner that prevents tampering or unauthorized alterations. Once registered on the blockchain, the content's ownership history becomes permanently visible, allowing users to confirm that their work remains uniquely theirs, even as it circulates within the community. This system also simplifies the process of transferring ownership of digital assets, as transactions can be logged and verified transparently, reducing the risk of disputes or fraudulent claims.

In addition to securing user-generated content, blockchain integration would greatly improve the transparency and reliability of the present invention's marketplace. When products—whether physical goods, digital assets, or creative works—are listed for sale, the blockchain ledger could be used to verify the authenticity and ownership of these items. Each transaction would be recorded on the blockchain, ensuring that buyers can easily verify the origins of a product and confirm its legitimacy before making a purchase. This decentralized verification process guarantees that all transactions conducted within the marketplace are secure, trustworthy, and legally compliant, providing users with the peace of mind that they are engaging in a safe and transparent commerce environment.

For digital products, such as e-books, music, software, or NFTs (non-fungible tokens), blockchain verification offers an added layer of protection by ensuring that ownership is securely transferred and that the digital goods cannot be duplicated or counterfeited. Buyers can rely on the blockchain to confirm the authenticity of digital goods, knowing that the transaction history is publicly accessible and verifiable, thereby significantly reducing the risk of acquiring counterfeit or unauthorized copies of digital products.

Moreover, the smart contract functionality of blockchain could be integrated into marketplace transactions to further automate and secure the exchange of goods. Smart contracts would ensure that all terms of the transaction—such as payment, delivery, and ownership transfer—are enforced automatically without the need for third-party intervention. This ensures that both buyers and sellers are protected, as the smart contract will only execute once all conditions have been met, ensuring compliance with the agreed terms. For example, in a digital art sale, the smart contract would release the ownership rights to the buyer only after payment is verified, and the transaction is logged immutably on the blockchain, guaranteeing the security of both parties.

The benefits of blockchain integration within the present invention extends beyond just content verification and marketplace transparency; it also offers a level of accountability and trust that is increasingly critical in digital ecosystems. As users interact within the platform—whether by contributing content, purchasing goods, or sharing creative works—they can do so knowing that blockchain technology provides a clear and immutable record of these actions, ensuring that their rights and contributions are safeguarded at all times.

By offering optional blockchain integration, the present invention provides users with the choice to utilize this powerful technology where it is most beneficial—particularly in cases involving high-value digital assets, intellectual property, or commerce. This flexibility ensures that the platform can serve a wide variety of users, from everyday content creators to professionals in creative industries, all while maintaining the highest standards of security, transparency, and legal compliance across all interactions within the ecosystem.

Future Developments and Potential Enhancements: The present invention is built with an eye toward the future, offering a highly adaptable and future-proof platform designed to integrate seamlessly with emerging technologies. This adaptability ensures that the present invention remains at the cutting edge of user engagement by leveraging advancements such as Virtual Reality (VR), Augmented Reality (AR), Artificial General Intelligence (AGI), and superintelligence. These technologies hold immense potential to further elevate the interactive experiences within the present invention, transforming the way users engage with digital content and enhancing their overall immersion in both physical and virtual environments.

As AR and VR technologies continue to evolve, the present invention is poised to integrate these tools to create more immersive experiences for its users. For example, AR-enhanced overlays could allow users to interact with real-world objects and locations by overlaying digital content in a way that merges physical and digital experiences. Imagine a user walking through a retail store, where AR overlays within the present invention provides real-time information about the products they are viewing, from user reviews and product specifications to interactive promotions or tutorials. In educational or museum settings, AR could enrich exhibits with supplemental digital content, offering additional layers of interactivity that enhance learning and engagement. Similarly, VR integration could create fully immersive environments, where users can explore virtual spaces filled with linked content, allowing them to engage with information in ways that were previously unimaginable.

The introduction of AGI and superintelligence would further enhance the capabilities of the present invention, bringing intelligent assistance and real-time predictive analytics to the platform. For example, smart shopping assistants powered by AGI could analyze a user's behavior, preferences, and browsing patterns to predict their needs and offer personalized recommendations. This assistant could navigate the present invention's marketplace on behalf of the user, guiding them to the most relevant products or content, assisting with transactions, and even facilitating automated purchasing based on pre-established preferences or behaviors. Such a system would enhance the user experience by providing proactive, intelligent assistance that adapts dynamically to individual users' needs, creating a more seamless and intuitive shopping or content engagement process.

These AGI-powered systems could also be employed to enhance collaborative efforts within the present invention by offering intelligent suggestions during content creation, analyzing group behavior to optimize workflows, and predicting project outcomes based on user input and historical data. This type of advanced intelligence could transform how teams work together within the platform, providing real-time support that enhances creativity, efficiency, and problem-solving.

Another exciting potential enhancement lies in the integration of decentralized identity verification using blockchain technology. This would provide a secure and transparent method for verifying the identities of content creators and participants within the present invention's ecosystem, adding another layer of trust and accountability. This verification could be particularly valuable in e-commerce transactions and content ownership claims, ensuring that all participants in the platform are legitimately authenticated. By storing identity credentials on a decentralized blockchain ledger, the present invention would allow users to verify their identities without relying on centralized systems that can be vulnerable to breaches or manipulation. This decentralized approach would be especially useful in industries that demand high levels of security and transparency, such as intellectual property management, digital art, or other high-value content creation.

Superintelligence could be utilized to monitor and optimize the platform's operations on a larger scale, offering insights into user behavior, platform performance, and even predicting future trends. This predictive capability would allow the present invention to evolve proactively, continuously improving based on data-driven insights. For instance, superintelligence could identify patterns of user engagement and recommend changes to the platform's structure or feature set, ensuring that it remains aligned with the evolving needs of its user base. Such enhancements would make the present invention a self-optimizing ecosystem, capable of growing and adapting alongside the rapid developments in technology and user expectations.

The potential for immersive environments, intelligent assistance, and predictive analytics within the present invention reflects its design as a dynamic platform that can harness emerging technologies to push the boundaries of user engagement. Whether through AR-enhanced interactions, AGI-driven smart assistants, or decentralized identity verification, the present invention is positioned to be a leading force in the future of digital content creation and interactive experiences.

By leaving space for these future developments, the present invention not only ensures its relevance and adaptability in a rapidly changing technological landscape but also offers a glimpse into a future where users interact with content and each other in increasingly intelligent, secure, and immersive ways. The platform is set to remain future-proof, capable of integrating these groundbreaking technologies as they mature, further solidifying the present invention as a pioneering force in content sharing, digital collaboration, and marketplace innovation.

Conclusion: The present invention's framework represents a groundbreaking innovation in the way users interact with online content, seamlessly blending social media, content sharing, and e-commerce into a single, intelligent platform. By utilizing a unique non-intrusive overlay system, the present invention allows users to engage deeply with web pages without disrupting the integrity of the original content. This system, combined with AI-powered personalization, gamification, and integrated marketplace functionality, fosters a dynamic and engaged community where users can create, share, and interact with content in ways that are both meaningful and intuitive.

The present invention offers an exceptional blend of community-driven interaction and commercial opportunity, making it more than just a content-sharing platform. The gamification system incentivizes participation and collaboration, encouraging users to actively contribute while earning recognition for their efforts. Simultaneously, the marketplace integration provides a space for users to engage in e-commerce, where products and services can be seamlessly bought and sold alongside the content. This convergence of features enables users to transition effortlessly between social engagement, content creation, and business transactions, making the present invention a multifunctional hub for modern digital life.

The platform's potential for integrating emerging technologies such as Augmented Reality (AR), Artificial General Intelligence (AGI), superintelligence, and blockchain further solidifies its position as a forward-thinking, adaptable solution for modern online interactions. The incorporation of AR could enhance the user experience by overlaying digital content in physical spaces, creating immersive interactions that blend the real and digital worlds. Meanwhile, AGI and superintelligence promise to offer intelligent assistance and predictive analytics that could revolutionize user engagement by delivering personalized, context-aware content in real-time. The optional use of blockchain technology for content verification and decentralized identity management offers a transparent and secure foundation for transactions, digital ownership, and identity verification within the present invention's ecosystem, ensuring trust and security in every interaction.

By preserving the integrity of original web pages, the present invention maintains a respectful and legally compliant relationship with external content, allowing users to freely share and engage without infringing on the rights of others. The platform's commitment to legal compliance and ethical content creation ensures that users operate within safe boundaries, supported by automated systems that detect and prevent copyright infringement. Through its built-in user education resources and ongoing commitment to compliance, the present invention helps users navigate complex intellectual property laws while fostering a responsible content-sharing environment.

In addition to its innovative functionality, the present invention offers users a powerful and customizable platform that adapts to their specific needs. Whether users are seeking to collaborate on creative projects, engage with their community, or manage commercial transactions, the present invention provides the tools necessary to succeed in a versatile and future-proof environment. Its flexibility across various devices and platforms ensures that users can seamlessly engage with the platform regardless of their preferred technology, making it an accessible and universally applicable solution for individuals and businesses alike.

Looking ahead, the present invention is designed to remain at the forefront of digital innovation, continuously evolving to incorporate new technologies and meet the ever-changing demands of the online world. The platform's architecture is built to integrate cutting-edge advancements, ensuring that as technologies such as AR, AGI, and blockchain mature, the present invention will be ready to leverage their full potential. This future-proofing guarantees that the present invention will not only thrive in the present but also adapt and grow alongside the rapidly evolving digital landscape, securing its place as a pioneering force in content sharing, digital collaboration, and online commerce for years to come.

Ultimately, the present invention stands as a trailblazing tool for online engagement, offering a holistic and adaptable solution for users seeking to interact with web content in new and innovative ways. Its combination of advanced features, legal safeguards, versatility, and scalability positions it as a leader in digital platforms, capable of transforming the way individuals and businesses navigate the digital realm, fostering deeper connections, richer content interactions, and sustainable innovation.

Guest Access Mode (Alternative Embodiment 1): In an alternative embodiment of the invention, the system may provide a guest access mode, enabling unregistered users to browse and view supplemental content associated with web pages without requiring prior registration. This embodiment is designed to lower the barrier for users to engage with the platform, allowing them to experience the content and interaction features before committing to account creation.

Specifically, unregistered users can access the supplemental content via supported browsers using URL, vision technology, and/or content recognition/detection technologies. These unregistered users are given view-only permissions, meaning they can browse the content, but their interaction is limited to passive consumption. Interaction options such as commenting, rating, or posting new supplemental content are disabled for unregistered users.

However, once an unregistered user attempts to post supplemental content or engage in more interactive actions, they are required to complete a registration process and create a user profile. This allows the system to track their contributions and provide personalized experiences based on their activities.

Furthermore, in this embodiment, the system may track the unregistered user's viewing behavior anonymously for the purpose of generating recommendations. The unregistered users are periodically prompted to register for an account based on their interaction level with the content, encouraging deeper participation in the community.

Content Blocking by Registered Users (Alternative Embodiment 2): In another alternative embodiment, the system introduces an enhanced privacy feature that allows registered users to control who can access and interact with their submitted supplemental content. This embodiment is aimed at giving registered users greater control over their contributions, specifically by enabling them to block unregistered users from viewing or interacting with their content.

Registered users are provided with a privacy dashboard that allows them to customize their content visibility settings. They can choose to restrict access to their supplemental content entirely from unregistered users or selectively block certain interactions, such as commenting, rating, or sharing, while still allowing unregistered users to view the content.

Moreover, registered users can restrict access to their content based on specific attributes of other users, such as their registration status, activity level, or membership tier within the community. For example, a registered user may choose to make their supplemental content visible only to a specific group of community members while hiding it from others.

This embodiment may also support temporary access to supplemental content for unregistered users through time-limited sharing links or invitations. Registered users can generate such links to provide controlled access to their content for a limited time without requiring the recipient to create a profile.

This alternative embodiment offers flexibility and privacy, allowing registered users to control how their content is shared and who can interact with it, while still preserving the broader accessibility of the platform for unregistered users who are exploring the system.

Addendum—Original Disclosure from Provisional Application No. 63/538,466 (Filed Sep. 14, 2023)

The present invention's unique flexibility enables dynamic interaction across industry sectors and user contexts. The following illustrative examples, originally disclosed in Provisional Application No. 63/538,466, highlight practical scenarios and user engagements made possible by the framework.

The present invention represents a groundbreaking stride within the sphere of social media and online content delivery, addressing the perennial objectives of Advertising, Marketing, and Entertainment industries, as well as Ecommerce enterprises. These sectors have consistently pursued avenues to expand their social engagements, foster enhanced audience interactions, and establish novel methods for engaging clientele and fan communities. The present business method emerges as a transformative technology that empowers the associated community to establish direct connections with their chosen industries and areas of personal, business, medical, entertainment and/or any other interest.

In the ever-evolving landscape of Advertising, Marketing, and Entertainment, as well as Ecommerce, there exists an inherent desire to forge deeper bonds with audiences, customers, and fans. The present technology stands as a remarkable innovation facilitating such aspirations. For instance, this inventive technology facilitates a dynamic platform where diverse individuals can engage with their preferred industries and renowned figures. Consider a scenario where a budding actress, driven by her aspirations, seamlessly links herself to her idolized actor through the framework of the present invention. This connection not only allows her to present her talent and aspirations to the frameworks thriving community but also opens an unprecedented avenue of engagement for the actor, fostering a reciprocal interaction. Consider a web site rating system where the community can share their thoughts and ideas regarding the performance, quality, service and experience with particular web sites.

Likewise, the present invention extends its transformative potential to the realm of the music industry. An aspiring musician, seeking to share their craft, can readily establish a link with their cherished Band through this technology. Such a connection creates a novel channel for the Band to immerse themselves in the life experiences of their fervent fans, transcending traditional boundaries of engagement.

Moreover, the present invention finds application beyond the realms of Entertainment and delves into the nuances of Ecommerce. Picture a scenario where a conscientious grocery store clerk, deeply knowledgeable about health food products, employs the present inventions framework to enlighten a community of health enthusiasts about the intricacies of food labeling. This symbiotic interaction enhances consumer awareness while forging a stronger bond between the store and its clientele.

Incorporating these innovative functionalities, the present invention stands as a conduit for diverse industries, fostering direct engagement between creators, performers, entrepreneurs, and their audiences. This technology transcends the conventional paradigms of online interactions, unlocking novel avenues for content sharing, education, and entertainment. Through the detailed description provided in this patent application, the intricate workings of the present invention's business method, from its foundational concepts to its intricate mechanisms of member registration, webpage tagging, permissions, and content delivery, are meticulously elucidated. In essence, the present invention ushers in a new era of interactive and personalized online content sharing, amplifying engagement, knowledge dissemination, and community connection to unparalleled heights.

The following section contains the original "Detailed Description of the Invention" from the aforementioned provisional application, incorporated by reference in this application. This material is included to reinforce written description and enablement support for claimed subject matter, and does not introduce new matter.

Additional technical and functional details are disclosed in the Addendum section, which reproduces the full 'Detailed Description of the Invention' from the parent provisional application.

DETAILED DESCRIPTION OF THE INVENTION

Core Business Method Technology:

The present invention is a business method deployed as a software based framework that meticulously facilitates enhanced webpage engagement within an online community. The present invention's framework is a software-based system that can take the form of various technologies such as a Smart Phone App, a Chrome-like extension, an Internet Browser program, smart watch App or similar tools used for web browsing. The core concept centers around facilitating enhanced webpage engagement within this online community through an innovative method as described in the following steps:

1. Creating community based member profiles to represent individuals, businesses, or organizations;
2. Allowing members to create links to and/or assert ownership claims over specific online resources;
3. Empowering members to enrich linked and/or claimed resources by contributing diverse content;
4. Establishing seamless connections between linked and/or claimed resources and contributed content;
5. Alerting subsequent member visitors of linked and/or claimed web pages of the existence of the active links and/or claims associated with that current webpage where:
a. the alert feature does not alter the original webpage content in any way;
b. provides a means by which to access the associated additional content posted by their member peers;
c. provide a means by which to navigate to that member's published profile.

Where creating a community based member profile to represent individuals, businesses, or organizations also embodies the concept of creating a membership account within the framework. Whereby, a member's profile may be as simple as a username associated with a registered email address or as extensive as to include photos, videos, audio, personal or professional information, contact information, personal preferences, links, political alignments or any other personal, business or organizational content currently used on any other social media platform.

Additionally, where allowing members to create links to and/or assert ownership over specific online resources describes the means by which to identify specific web pages. \'hereby, the framework may deploy webpage "tagging" technologies that can, at any future point, recognize previously tagged web pages by recording and subsequently comparing URLs, content parsing, photo recognition, ciphers, image encoding and decoding technologies. This procedure results in the creation of a database that stores these member asserted linkages, effectively connecting members with their linked and/or claimed web pages. Where links may be used to express, through additional uploaded content the member can associate with these links, an interest in, opinion on, affinity with, support for, rejection of, or any other personal, business and/or organizational motivation. Additionally, where member claims work in exactly the same way as links but allow members to assert their legal ownership over specific web pages and/or entire websites.

Further, where the alert feature may consist of something as basic as a hyperlink navigational button that begin to illuminate in the user's browser toolbar when a linked and/or claimed webpage is visited and that self extinguishes upon departure from such linked and/or claimed web page. Likewise, this hyperlink navigational button remains extinguished while visiting web pages void of active community links and/or claims.

For example, a member may create a link to an existing webpage as a result of personal, business or organizational interest. Likewise, in the alternative they may claim ownership of a specific webpage. In both instances a record of the link and/or claim is stored in a database and associated with his/her profile. In addition, this member may also associate additional content with their previously linked and/or claimed web pages for broadcast/publication throughout the entire framework's active community. Subsequently, when any other member using the framework visits a previously linked and/or claimed page they are alerted to the existence of the link and/or claim and provided with a navigation means by which to access the additional content and/or visit the profile of the original linker and/or claimant. Conversely, multiple links and/or claims may be presented against the very same web page where a notification list type system would allow for corresponding access to the independent bodies of additional content posted by their respective and individual member profiles.

The present invention introduces the first innovative business method designed to enrich the online experience for visitors of specific linked and/or pre-claimed web-pages. The technology provides a mechanism for delivering additional content, tailored to individual user preferences, while preserving the integrity of the original webpage content. Importantly, the framework operates within the confines of copyright laws, ensuring compliance throughout its operational process.

Operation Overview:

Registration: The invention adopts a community-based infrastructure, necessitating user registration through the framework's associated website or associated software. Following registration, users may be directed to download the framework's software, available in various formats including browser extensions, smart phone apps, and other internet browser software solutions for personal computing devices.

Member profiles: allow for the creation of personal, business and organizational profiles that can be used to be exhibited to other community members. These profiles can feature the wide array of content disbursable through any other social media platform. Such as, Photos, Audio, Video, Text messaging, video conferencing, games, posts etc. . . . .

Linking Web Pages: Members of the present inventions community can create links to specific web-pages using distinct identification methods. These methods encompass elements such as URL recording, content parsing for proprietary codes, photo recognition, ciphers, image encoding, and decoding technologies. User link alerts link back to posted content published and maintained on members profile and/or other associated and controlled pages.

Claiming Web Pages: Members of the present inventions community can establish claims to specific web-pages using distinct identification methods. These methods encompass elements such as URL recording, content parsing for proprietary codes, photo recognition, ciphers, image encoding, and decoding technologies. User claim alerts link back to posted content published and maintained on members profile and/or other associated and controlled pages.

Optional Permissions Rating: The framework introduces an optional granular permission system, enabling users to define content visibility for specific members or groups. This system offers versatility by incorporating lists such as friend/follow lists and public content dissemination options, accommodating a spectrum of engagement preferences.

Optional Page Claim Identifier: As part of the claiming process, members may optionally be required to upload a plurality of page identifying content to the chosen web-page. This content aligns with the identification methods outlined in the claiming process.

Optional Verified vs. Unverified Member Treatment: An optional approach permits multiple unverified members to establish links and/or claims to the same web-page. In such cases, visiting members are presented with a list of linkers and/or claimants, each offering supplemental content. Verified members receive identifiable markings, and their content holds precedence over linkers and/or unverified claimants. However, even after the successful verification of a claimant, the other existing linkers and/or claimants of the now verified sites will still be listed as linkers and/or unverified claimant(s) (i.e. friend of) and their added content and user-based enhancements will remain accessible to subsequent visitors. Once verified, the legal owner's status is made clear to all future visitors. This verified owner may also be granted certain authority, such as the ability to take irreversible actions like deleting or banning other linkers and/or unverified claimants, their content, or claims.

Launching and Navigating: The framework of the present invention operates seamlessly, allowing users to navigate the internet or specific websites organically. Visitors access each page's original content as intended by the webpage owner, maintaining conventional web-surfing experiences.

Visiting Claimed Web Pages: Upon visiting a webpage linked and/or claimed by another member, users are promptly alerted as to the linkers' and/or claimants' associations. The option to access existing supplemental content is provided through various alert mechanisms, such as pop-ups, tool bar navigation buttons, auditory cues, JavaScript page injection or the dynamic creation of additional browser tabs.

Leaving claimed Webpage: When users depart from a linked and/or claimed page, the alert mechanisms adapt accordingly. Transitioning to non-member pages halts existing alerts, while visiting another member's linked and/or claimed page updates the alerts with the respective member's supplemental content.

Optional Supplemental Content: The additional content, customizable to match standard webpage offerings, can include images, audio, video, hyperlinks and text. It may also provide access to framework-sourced content like classified listings, dating sites, and auctions. Auto redirect capabilities facilitate instant navigational shifts, and custom programs may be automatically downloaded and installed under specific circumstances.

Browser Functionality: The framework ensures that webpages are consistently rendered in accordance with the webmasters' intentions. The technology refrains from altering these renderings, maintaining the original content's authenticity. In some instances, however, user authorized limited alterations may occur to facilitate notifications or navigation, such as JavaScript page injection.

Handling Page Link and/or Claim Identifiers: The framework continuously monitors visited web¬ page content for page links and/or claim identifiers, as defined in the claiming process. Upon detection, the system accesses the framework's database to ascertain active links and/or ownership claims and specific handling instructions. Content controlled by the original claimant is subsequently loaded, often in the form of tabs or additional windows/screens.

Optional Internal Messaging System: Embedded within the framework is an optional internal messaging system, facilitating dynamic discussions through text messaging, audio/video chats, and email forwarding between active members.

Optional Notification Systems: The present invention may also feature a host of notification services such as receiving notification regarding "likes" submitted by other members, comments left by other members, replies to comments, shares, emoji submissions, received text messages or email messages, initiation of live video, audio/video chats, text, photo and/or video uploads, post comments and replies to post comments. Likewise, notification services may exist for any other type of community action, interaction and submission available through any other current social media platform.

In conclusion, this inventive business method introduces an innovative paradigm in web content engagement, seamlessly blending personalized user experiences, legal compliance and interactive intercommunication. This patent application delves into the comprehensive workings of the framework, elucidating its intricate processes from member registration and webpage linking and/or claiming to permissions, content delivery, and beyond. This technology manifests a new era of online content interaction, fostering dynamic connections, educational exchanges, and enriched community participation.

What is claimed:

1. A system for associating supplemental content with non-local web-based digital resources while retaining compliance with copyright, terms of service, the California Consumer Privacy Act (CCPA), the General Data Protection Regulation (GDPR), the Digital Millennium Copyright Act (DMCA), and other applicable digital rights and data protection regulations, comprising:

(a) one or more processors configured to execute instructions within an interface capable of accessing web-based digital resources, including but not limited to browser-based environments, embedded web views, and other web-accessible platforms; and (b) memory storing instructions that, when executed by the one or more processors, cause the system to:

(i) maintain user accounts enabling the creation, deletion, update, detection, and access of supplemental content via web-accessible platforms;

(ii) generate unique identifiers for web-based digital resources through content analysis techniques, including at least one or more selected from the group consisting of content parsing, ciphers, URL recording, photo recognition, image encoding/decoding, content parsing for proprietary codes, but not limited to these methods;

(iii) wherein the system is configured to utilize these techniques either simultaneously or sequentially, based on system requirements;

(iv) associate supplemental content with the unique identifiers while maintaining separation from the original digital resources within the interface;

(v) store associations between user accounts, supplemental content, and unique identifiers in a web-accessible database;

(vi) enable access to supplemental content upon subsequent recognition of the unique identifiers faithfully reproduced in response to linked digital resources; and (vii) wherein compliance with copyright, terms of service, CCPA, and GDPR is ensured through mechanisms including user consent management, encryption, client-side operation, and data anonymization.

2. The system of claim 1, wherein the generation of unique identifiers comprises at least one or more techniques selected from the group consisting of URL recognition, metadata parsing, structural pattern analysis, ciphers, general encoding and decoding, detection mechanisms, URL recording, metadata tagging, photo recognition, image encoding/decoding, content parsing for proprietary codes, OCR-based text extraction, computer vision for analyzing visual and textual elements, and AI-based HTML fingerprint generation.

3. The system of claim 1, further comprising a non-intrusive notification mechanism to alert users to the availability of supplemental content associated with web-based digital resources, wherein the notification mechanism comprises:

(a) visual, auditory, or contextual cues integrated into the browsing environment to indicate the presence of supplemental content, including pop-ups, toolbar navigation buttons, hyperlink navigation buttons, and JavaScript page injection;

(b) targeted auto-navigation and auto-redirect capabilities to a destination specified by a content creator;

(c) dynamic creation of additional browser tabs to display supplemental content alongside original web pages;

(d) dynamic adjustment of notification delivery based on user preferences, engagement patterns, or content relevance; and (e) configurable notification settings enabling users to manage alert types, timing, and frequency.

4. A system for associating supplemental content with non-local web-based digital resources while retaining compliance with copyright, terms of service, the California Consumer Privacy Act (CCPA), the General Data Protection Regulation (GDPR), the Digital Millennium Copyright Act (DMCA), and other applicable digital rights and data protection regulations, comprising:

(a) one or more processors configured to execute instructions within an interface capable of accessing web-based digital resources, including but not limited to browser-based environments, embedded web views, and other web-accessible platforms; and (b) memory storing instructions that, when executed by the one or more processors, cause the system to:

(i) maintain user accounts enabling the creation, deletion, update, detection, and access of supplemental content via web-accessible platforms;

(ii) generate unique identifiers for web-based digital resources through content analysis techniques that comprises at least one or more techniques selected from the group consisting of URL recognition, metadata parsing, structural pattern analysis, ciphers, general encoding and decoding, detection mechanisms, URL recording, metadata tagging, photo recognition, image encoding/decoding, content parsing for proprietary codes, OCR-based text extraction, computer vision for analyzing visual and textual elements, and AI-based HTML fingerprint generation;

(iii) wherein the system is configured to utilize these techniques either simultaneously or sequentially, based on system requirements;

(iv) associate supplemental content with the unique identifiers while maintaining separation from the original digital resources within the interface;

(v) store associations between user accounts, supplemental content, and unique identifiers in a web-accessible database;

(vi) enable access to supplemental content upon subsequent recognition of the unique identifiers faithfully reproduced in response to linked digital resources; and (vii) wherein compliance with copyright, terms of service, CCPA, and GDPR is ensured through mechanisms including user consent management, encryption, client-side operation, and data anonymization.

5. The system of claim 4, wherein the system enables access to supplemental content for unregistered users, comprising:

(a) limiting unregistered users to view-only permissions for supplemental content associated with web-based digital resources;

(b) restricting unregistered users from performing interactive actions, including commenting, rating, or contributing new supplemental content; and (c) anonymously tracking unregistered user interactions to generate recommendations without storing personally identifiable information.

6. The system of claim 4, wherein the unique identifier generation comprises:

(a) analyzing web-based digital resources using AI-based HTML processing techniques, including structural pattern recognition, DOM element analysis, and feature extraction algorithms, to create robust and dynamic fingerprint identifiers capable of adapting to changes in web page layouts and content;

(b) computer vision algorithms for analyzing web-based visual content;

(c) URL normalization for consistent identifier generation;

(d) metadata extraction for supplemental context;

(e) structural analysis of HTML tags and elements; and (f) content fingerprinting techniques to ensure resource uniqueness.

7. The system of claim 4, wherein content identifying uses one or more of:

(a) content capture via browser extensions;

(b) visual processing and pattern detection of HTML elements;

(c) contextual analysis of web page content; and (d) structural recognition of DOM elements.

8. The system of claim 4, wherein privacy protection is implemented using:

(a) data encryption to secure user interactions;

(b) compliance management to adhere to privacy regulations, including but not limited to the General Data Protection Regulation (GDPR) and the California Consumer Privacy Act (CCPA);

(c) consent tracking mechanisms to manage and log user permissions for supplemental content access, including mechanisms to enable transparent user consent withdrawal or modification; and (d) audit logs demonstrating compliance with privacy regulations.

9. The system of claim 4, wherein security features and monitoring comprise:

(a) threat detection to monitor browser-based activities;

(b) prevention mechanisms to block unauthorized access;

(c) security enforcement to maintain content and user data integrity;

(d) real-time security against scams using AI-driven anomaly detection and encryption-based safeguards; and (e) real-time monitoring of user-generated supplemental content using AI algorithms to identify and flag inappropriate, illegal, or non-compliant posts based on geographical location and associated regional laws.

10. The system of claim 4, wherein content management includes:

(a) version control for supplemental content updates;

(b) access management to define user permissions; and (c) distribution control to manage content visibility across web-based platforms.

11. The system of claim 4, wherein accessibility features include:

(a) navigation assistance for users with disabilities;

(b) content assistance for visually impaired users; and (c) compatibility with screen readers for web-based environments.

12. The system of claim 4, further comprising a non-intrusive notification mechanism to alert users to the availability of supplemental content associated with web-based digital resources, wherein the notification mechanism comprises:

(a) visual, auditory, or contextual cues integrated into the browsing environment to indicate the presence of supplemental content;

(b) targeted auto-navigation to a destination specified by a content creator, wherein the destination is reviewed and approved by an AI-based compliance system to ensure adherence to platform rules and guidelines;

(c) dynamic adjustment of notification delivery based on user preferences, engagement patterns, or content relevance; and (d) configurable notification settings enabling users to manage alert types, timing, and frequency.

13. The system of claim 4, wherein the system comprises AI-driven content curation and association features including:

(a) analyzing user behavior, preferences, and contextual relevance to recommend or generate content dynamically;

(b) predictive algorithms that analyze user behavior, preferences, and contextual relevance to deliver anticipatory content associations in real-time; and (c) maintaining supplemental content association with digital resources by dynamically adapting to structural or content changes within the resources using AI-driven pattern recognition, tagging, and metadata analysis.

14. The system of claim 4, wherein the system enables customized content sharing through:

(a) user-customizable visibility settings for supplemental content, including the ability to restrict access based on user attributes, activity levels, or group membership;

(b) generation of time-limited access links for supplemental content, enabling temporary sharing without requiring user registration; and (c) overlay capabilities for supplemental content in augmented reality environments, enabling enhanced interaction with digital resources.

15. The system of claim 4, further comprising augmented reality (AR) capabilities integrated into the platform, wherein a mobile interface recognizes real-world objects and links them to supplemental digital content, enabling immersive interactions in retail, education, and entertainment environments.

16. The system of claim 4, wherein verification of user-generated supplemental content is implemented using blockchain technology, ensuring immutability and integrity of content ownership and association with web pages.

17. The system of claim 4, wherein smart contracts are incorporated to automate secure e-commerce transactions, verifying transaction conditions before releasing payments or digital assets.

18. The system of claim 4, further comprising machine learning algorithms for dynamically adjusting supplemental content delivery based on user behavior and engagement patterns, wherein interaction data is analyzed to refine future content recommendations.

19. The system of claim 4, further comprising a collaborative content creation and editing module that allows multiple users to contribute to a shared content overlay in real-time, with version control and moderation tools.

20. The system of claim 4, wherein a notification mechanism is integrated into the web browsing experience, providing non-intrusive visual and auditory alerts to indicate the presence of supplemental content without altering the original web page.

21. The system of claim 4, further comprising instructions that, when executed by the one or more processors, cause the system to implement client-side web resource association by:

(a) executing all webpage identification and analysis operations exclusively within the client browser environment;

(b) generating resource identifiers without any server-side interaction with target webpages;

(c) maintaining supplemental content associations purely through client-side operations; and (d) enabling content overlay without modifying or interacting with original web resources.

22. The system of claim 4, further comprising instructions that, when executed by the one or more processors, cause the system to maintain dynamic content associations in the web browsing environment by:

(a) monitoring identified webpages for structural or content changes;

(b) detecting modifications to webpage elements using content parsing and vision-based analysis;

(c) automatically updating content associations to maintain accuracy; and (d) preserving supplemental content links despite webpage modifications.

23. The system of claim 4, further comprising instructions that, when executed by the one or more processors, cause the system to implement granular permission-based content access control by:

(a) maintaining hierarchical permission levels for content access;

(b) enabling content creators to define specific visibility rules;

(c) enforcing group-based and individual access restrictions; and (d) validating user permissions before displaying supplemental content.

24. The system of claim 4, further comprising instructions that, when executed by the one or more processors, cause the system to enable community-driven web resource evaluation by:

(a) enabling community members to submit structured evaluations of web resources;

(b) aggregating multiple user experiences into comprehensive resource ratings;

(c) maintaining separation between ratings and original web resources; and (d) providing real-time access to community evaluations during web browsing.

* * * * *